May 23, 1944.  J. W. MARDEN ET AL  2,349,360
DISK-TYPE FLUORESCENT LAMP
Filed Jan. 24, 1942
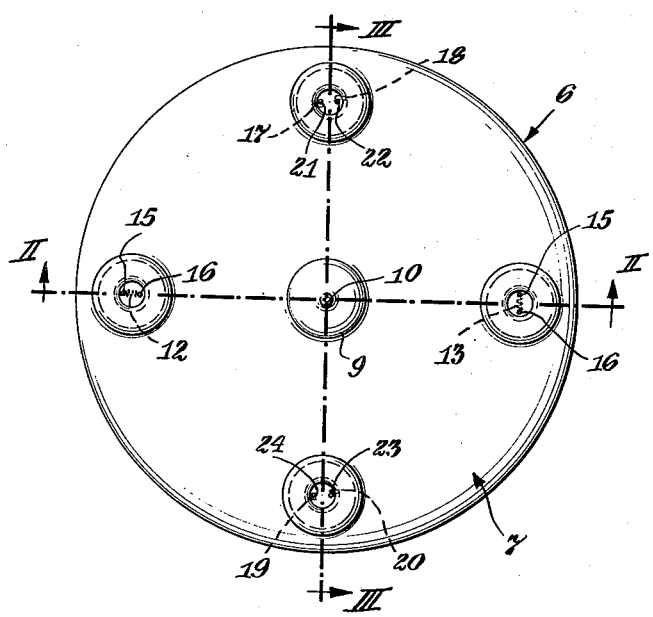
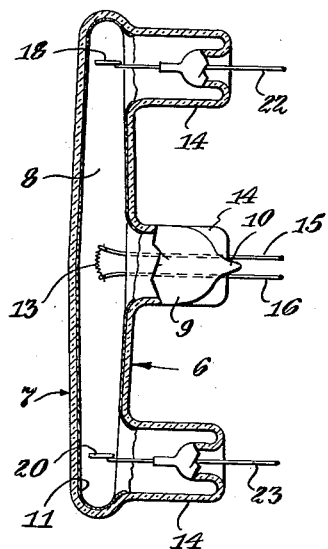
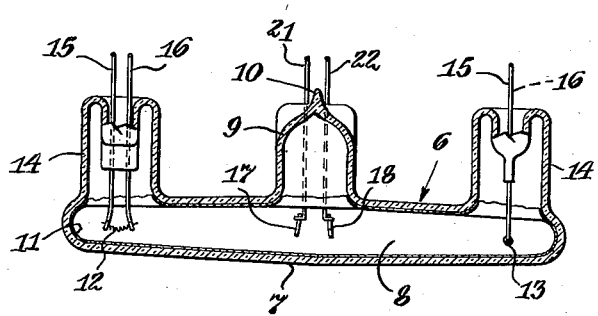
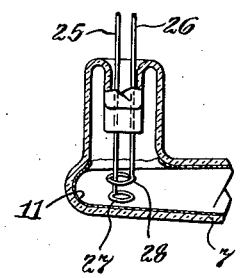
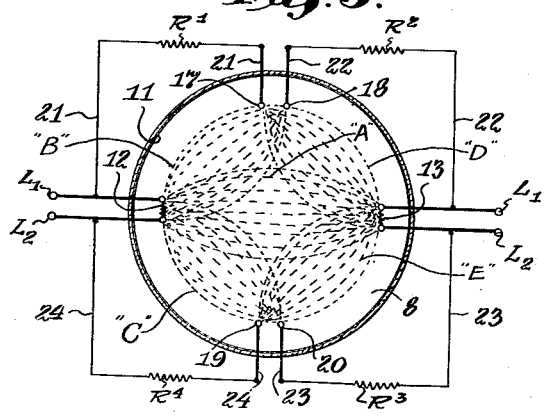
INVENTORS
J. W. MARDEN
G. MEISTER
BY
ATTORNEY Patented May 23, 1944

2,349,360

UNITED STATES PATENT OFFICE 2,349,360

DISK-TYPE FLUORESCENT LAMP

John W. Marden, East Orange, and George Meister, Newark, N. J., assignors to Westinghouse Electric & Manufacturing Company, East Pittsburgh, Pa., a corporation of Pennsylvania Application January 24, 1942, Serial No. 428,058

6 Claims. (Cl. 176—122)

This invention relates to gaseous discharge devices, especially to fluorescent lamps, and more particularly to a lamp of generally flattened or disk-like form, having a relatively large surface area to increase the total visible radiations available for effective illumination, such a lamp forming the subject-matter of Letters Patent 2,255,431, issued to the owner of the instant application as assignee of the present applicants.

An object of the present invention is to provide a fluorescent lamp of the flattened or disk-shaped type free from the ribs and partitions by which, in the lamp of our aforesaid patent, the discharge between the electrodes is diffused for exciting substantially the entire coated surface of the lamp. The construction of a lamp formed in two parts molded with ribs which are matched to constitute partitions for the diffusion of the discharge entails a cost which is inordinate when compared with any advantages secured by the tortuous path the partitions provide for the intended diffusion. Furthermore, we have ascertained that by the elimination of the ribs it is possible to utilize a bulb or flask of "blown bulb" construction, which has numerous advantages so well-known to those skilled in the art as not to require recital herein.

It is therefore an object of the present invention to provide a fluorescent lamp of the disk-like type in which the entire space confined by the glass envelope or bulb is substantially unobstructed throughout its area, and more particularly is free from undesirable ribs and partitions intended to diffuse the discharge.

A further object of the invention is to provide means, novel in such a fluorescent lamp, whereby diffusion of the discharge throughout the discharge chamber confining the arc is accomplished by a reliable non-mechanical action of an exclusively electrical character acting to direct the discharge to portions of the discharge chamber which, as is well-known, would in ordinary operation of such a disc-like lamp be left in a relatively "dark" condition, not contributing to the luminous efficiency of the lamp when operated under any commercial wattage.

For the purpose of attaining the last-named object, it is a further object to provide one or more auxiliary discharge paths controlled by the circuit of the device to accomplish the diffusion of the discharge without recourse to partitions in the discharge chamber. It is a still further object to provide, in combination with the known main electrodes for carrying the main discharge, a plurality of auxiliary "cold" anodes to effect diffusion of the discharge.

Still further objects of the invention will be made apparent by reference to the accompanying drawing wherein:

Fig. 1 is a plan view of a fluorescent lamp of disk-like type in the construction of which the invention has been embodied;

Fig. 2 is a view thereof in vertical section taken on the line II—II of Fig. 1;

Fig. 3 is a view in vertical section taken on the line III—III of Fig. 1;

Fig. 4 is a fragmentary detail view in vertical section illustrating a modified form of auxiliary electrode;

Fig. 5 is a diagrammatic view illustrating the circuit for operating a lamp as shown in Fig. 1 and Fig. 2 and illustrating the manner in which the total discharge is diffused throughout substantially the entire disk-shaped envelope.

Referring now to the drawing in detail, the reference character 6 designates generally a gaseous discharge device, in this instance a fluorescent lamp of disk-like type, comprising a bulb or flask 7 of relatively thin glass blown to desired shape and preferably having approximately the contour illustrated in Figs. 1 and 2, being disk-shaped and enclosing a space 8 constituting the discharge chamber, containing an ionizable medium and substantially unobstructed throughout its area, being free from ribs and partitions. It is shown as having a conventional exhaust tube 9 centrally disposed exteriorly at the top of the lamp, being sealed off at 10.

A coating of suitable fluorescent material 11 is provided, covering so much of the interior walls of the discharge chamber 8 confined by the envelope as may be found desirable and suitable, substantially the entire exposed area being so coated in the illustrative embodiment.

The activating arc, or what may be termed the main diffused discharge, is set up between filamentary electrodes 12 and 13, such as shown by the dotted lines "A" in Fig. 5, which electrodes are disposed at substantially diametric regions circumferentially of the chamber 8 into which they project through the top wall of the chamber 8, each being mounted in a press 14 of approved form. The leading-in and supporting conductors 15 and 16 may be provided with terminals of suitable construction to permit the lamp to be inserted in sockets (not shown) deriving a supply of commercial current from a suitable source thereof through conductors $L_1$ and $L_2$ (see Fig. 5).

In pursuance of that object of the invention which provides for auxiliary paths for diffusion of the discharge, the drawing shows auxiliary electrodes 17, 18, 19 and 20, made of a suitable metal, such as nickel or the like, each of which is connected to one side of the supply circuit of the customary domestic voltage or a transformer, by a suitable branch circuit including one of the external control resistances designated $R_1$, $R_2$, $R_3$ and $R_4$, the conductor for the auxiliary electrode 17 being designated 21 and connected to the main conductor $L_1$ leading to filamentary electrode 12, while the conductor 22 connects auxiliary electrode 18 to the main conductor $L_1$ leading from filamentary electrode 13; the conductor 23 connects the auxiliary electrode 20 to the main conductor $L_2$ leading to filamentary electrode 13; and the conductor 24 connects auxiliary electrode 19 with the main conductor $L_2$ leading to filamentary electrode 12.

In operation, the main voltage is applied between filamentary electrodes 12 and 13, and in this particular case the auxiliary electrodes 17, 18, 19 and 20 are cold electrodes, i. e., anodes while 12 and 13 are hot. The main diffused discharge "A" takes place between 12 and 13 as shown in Fig. 5. When the cathode 12 is negative on one half cycle, the discharge in addition to following the main diffused path "A" will find available and will follow in part the auxiliary diffused discharge path "B" and also the auxiliary discharge path "C" as shown in Fig. 5. On the other half cycle when the cathode 13 is negative, the diffused auxiliary discharge will be between "D" and "E" also as shown by the dotted lines in Fig. 5, in addition to following the main diffused discharge path "A" between filamentary electrodes 12—13, which of course alternate respectively between the status of each as anode and as cathode.

The result is that the entire discharge chamber 8 is filled by a totally diffused discharge thus provided without the use of ribs and partitions, and the illuminating efficiency is greatly increased as will be apparent to those skilled in the art.

It is to be understood that such modifications may be made in the details of construction as may be found desirable and suitable by those skilled in the art and instructed by the instant disclosure, when adapting the invention to the requirements of particular installations of our improved disk-type fluorescent lamp, as, for example, in the construction of the electrodes; and in Fig. 4 is shown a modified form of anode or auxiliary electrode in which small rings of nickel or the like 27 and 28 are made integral with, or metallically united to, the nickel leading-in wires 25 and 26.

We claim:

1. An electric discharge lamp comprising an envelope of glass forming a disk-shaped discharge chamber of relatively large area and substantially unobstructed throughout its enclosed space, a coating of fluorescent material on the walls of said chamber, an ionizable medium in said discharge chamber, a set of electrodes disposed therein adjacent the peripheral edge of the envelope and between which a main diffused electric discharge occurs with attendant excitation of said fluorescent coating upon application of a potential to said electrodes, and means to provide in said chamber at least one auxiliary diffused electric discharge path in electrical parallel with said main diffused electric discharge whereby the plurality of resulting diffused electric discharges excite substantially the entire coating of fluorescent material.

2. An electric discharge lamp comprising a disk-like envelope of glass forming a discharge chamber of relatively large space and substantially unobstructed throughout its enclosed area, being free from interior ribs and partitions, a coating of fluorescent material on the walls of said chamber, an ionizable medium therein, a set of main electrodes disposed within said chamber adjacent the peripheral edge of said disk-like envelope and between which a main diffused electric discharge occurs with attendant excitation of said fluorescent coating upon application of a potential to said electrodes, and means to provide in said chamber a plurality of auxiliary diffused electric discharge paths in electrical parallel with said main electric discharge whereby the plurality of auxiliary electric discharges are diffused to the regions of said chamber extending laterally from the main diffused electric discharge path and substantially throughout said disk-like envelope.

3. An electric discharge lamp comprising a disk-like envelope of glass forming a discharge chamber of relatively large space and substantially unobstructed throughout its enclosed area, being free from interior ribs and partitions, a coating of fluorescent material on the walls of said chamber, an ionizable medium therein, a set of main electrodes disposed within said chamber adjacent the peripheral edge of said disk-like envelope and between which a diffused electric discharge occurs with attendant excitation of said fluorescent coating upon application of a potential to said electrodes, and means to provide in said chamber a plurality of auxiliary diffused electric discharge paths in electrical parallel with said main diffused electric discharge whereby the plurality of electric discharges are diffused to the regions of said chamber extending laterally from the main diffused electric discharge path, said main electrodes being disposed diametrically opposite each other to carry the main diffused electric discharge, and said means comprising one or more auxiliary sets of electrodes disposed at circumferential regions of said chamber between said main electrodes to diffuse the resulting auxiliary electric discharges throughout substantially the entire disk-like envelope, and connections between said main electrodes and a source of commercial current, and other connections between said source and said auxiliary sets of electrodes.

4. An electric discharge lamp comprising a disk-like envelope of glass forming a discharge chamber of relatively large space and substantially unobstructed throughout its enclosed area, being free from interior ribs and partitions, a coating of fluorescent material on the walls of said chamber, an ionizable medium therein, a set of main electrodes disposed within said chamber between which a main diffused electric discharge occurs with attendant excitation of said fluorescent coating upon application of a potential to said electrodes, and means to provide in said chamber a plurality of auxiliary diffused electric discharge paths in electrical parallel with said main diffused electric discharge whereby the plurality of electric discharges are diffused to the regions of said chamber extending laterally from the main diffused electric discharge path and substantially throughout the entire disk-like envelope, said main electrodes being disposed adjacent the peripheral edge of said disk-like envelope and diametrically opposite each other to carry the main diffused electric discharge, and said means comprising one or more auxiliary sets of electrodes disposed at circumferential regions of said chamber between said main electrodes, and connections between said main electrodes and a source of commercial current, and other connections between said source and said auxiliary sets of electrodes, each of said last-named connections including a compensating resistance for controlling the current supplied to said auxiliary electrodes.

5. An electric discharge lamp comprising a disk-shaped envelope of relatively thin glass blown to form a discharge chamber of relatively large space and substantially unobstructed throughout its entire enclosed area, being free from interior ribs and partitions, a coating of fluorescent material on the walls of said chamber, an ionizable medium therein, a set of main electrodes disposed therein adjacent the peripheral edge of said disk-shaped envelope between which a main diffused electric discharge occurs upon the application of a potential to said main electrodes, and one or more sets of auxiliary electrodes disposed adjacent the peripheral edge of said envelope between said main electrodes to provide each an auxiliary diffused electric discharge path in electrical parallel with said main diffused electric discharge whereby said electric discharges are diffused throughout substantially the entire area enclosed by said discharge chamber.

6. An electric discharge lamp comprising a disk-shaped envelope of relatively thin glass blown to form a discharge chamber of relatively large space and substantially unobstructed throughout its entire enclosed area, being free from interior ribs and partitions, a coating of fluorescent material on the walls of said chamber, an ionizable medium therein, a set of main electrodes disposed therein adjacent the peripheral edge of said disk-shaped envelope between which a main diffused electric discharge occurs upon the application of a potential thereto, and one or more sets of auxiliary electrodes disposed adjacent the peripheral edge of said envelope between said main electrodes to provide each an auxiliary diffused electric discharge path in electrical parallel with said main diffused electric discharge whereby said discharges are diffused throughout substantially the entire area enclosed by said discharge chamber, said auxiliary electrodes being each formed of a nickel leading-in wire having integrated therewith a nickel annular-shaped anode.

JOHN W. MARDEN.
GEORGE MEISTER.